United States Patent
Schmidt et al.

(10) Patent No.: US 6,578,727 B2
(45) Date of Patent: Jun. 17, 2003

(54) MOUNTING FOR A FUEL TANK ON A MOTOR VEHICLE

(75) Inventors: Rainer Schmidt, Graben-Neudorf (DE); Albert Boecker, Karlsruhe (DE)

(73) Assignee: TI Group Automotive Systems Technology Center GmbH, Rastatt (DE)

( * ) Notice: Subject to any disclaimer, the term of this patent is extended or adjusted under 35 U.S.C. 154(b) by 0 days.

(21) Appl. No.: 09/780,168

(22) Filed: Feb. 9, 2001

(65) Prior Publication Data

US 2001/0020622 A1 Sep. 13, 2001

(51) Int. Cl.⁷ .............................................. B65D 88/12
(52) U.S. Cl. ..................................................... 220/562
(58) Field of Search ................................. 220/562, 476, 220/480, 481; 280/834, 830, 833; 248/300, 317, 220.1

(56) References Cited

U.S. PATENT DOCUMENTS

| | | | | |
|---|---|---|---|---|
| 3,650,501 A | * | 3/1972 | Streb | |
| 5,193,262 A | * | 3/1993 | Hyde et al. | 220/562 |
| 5,251,777 A | * | 10/1993 | McMahon | 220/480 |
| 5,366,246 A | * | 11/1994 | Chen et al. | 220/562 |
| 5,380,042 A | * | 1/1995 | Hively et al. | 220/562 |
| 5,515,997 A | * | 5/1996 | Kirk et al. | 220/562 |
| 5,673,940 A | * | 10/1997 | Gaisford et al. | 220/562 |
| 6,062,684 A | * | 5/2000 | Sasaki | |
| 6,211,566 B1 | * | 4/2001 | Bollesen | 257/707 |
| 6,402,199 B1 | * | 6/2002 | Wojnowski | 248/121 |

* cited by examiner

Primary Examiner—Stephen Castellano
(74) Attorney, Agent, or Firm—Reising, Ethington, Barnes, Kisselle & Learman, P.C.

(57) ABSTRACT

A device for mounting a plastic fuel tank on the body of a motor vehicle with a carrier which is shaped to fit at least partially to the outer contour of the tank and at least one coupling disposed between the carrier and the tank. The coupling is releasably connected with a snap fit to the carrier and preferably is made of a thermoplastic material that is heat welded to the plastic tank.

14 Claims, 2 Drawing Sheets

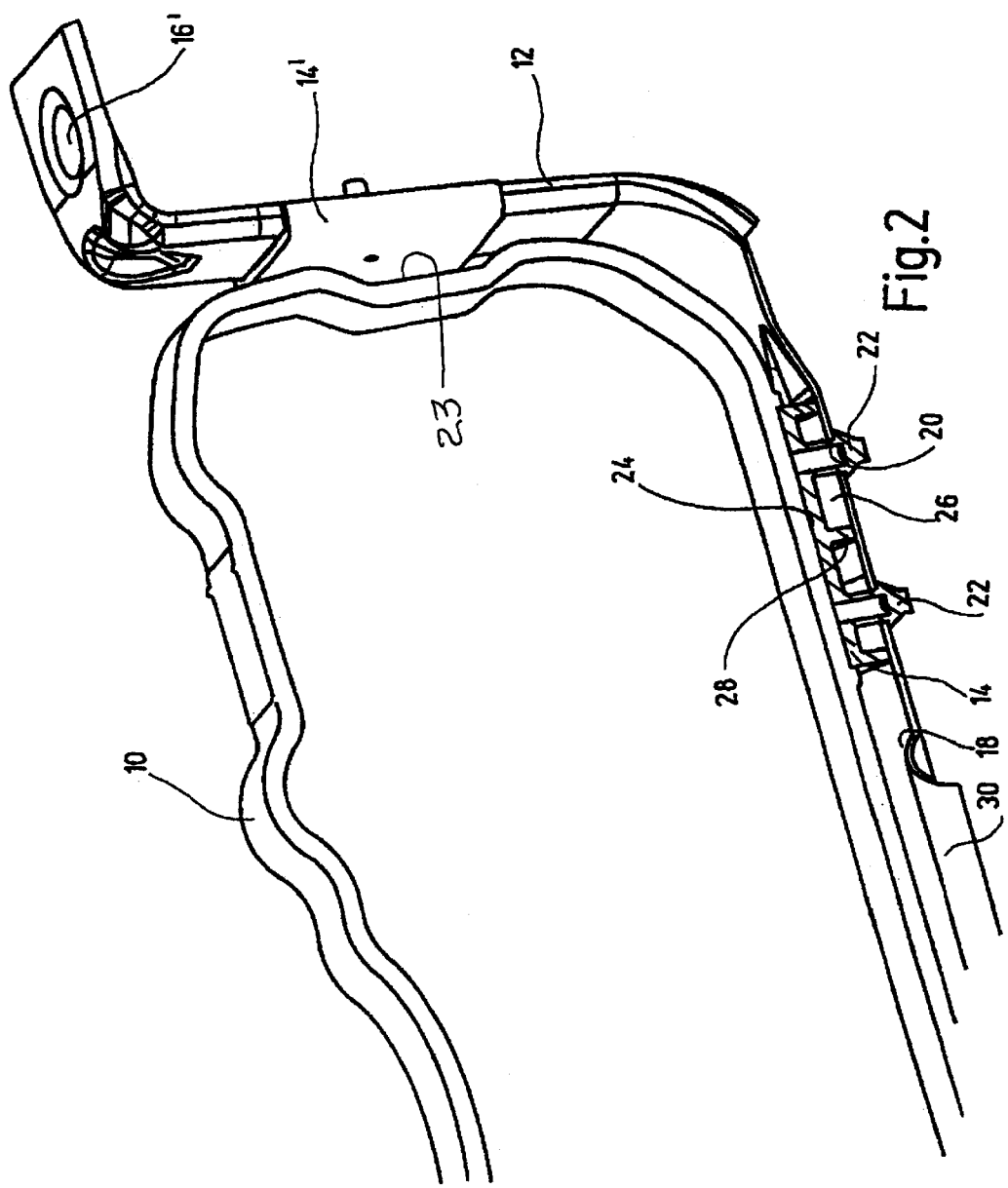

MOUNTING FOR A FUEL TANK ON A MOTOR VEHICLE

FIELD OF THE INVENTION

This invention relates to motor vehicle fuel systems and more particularly to a device for mounting a plastic fuel tank on a body or frame of an automotive vehicle.

BACKGROUND OF THE INVENTION

Previously, fuel tanks and particularly metal fuel tanks, have been mounted on an automotive body or frame by metal bands or straps underlying and received in recesses or grooves in the bottom wall of the tank and attached at their ends to the overlying vehicle body by fasteners such as bolts or by brackets fixed to the tank and attached by bolts to the vehicle body. Typically, the fuel tank, metal bands and bolts are supplied as separate parts to the automobile manufacturer which must be assembled and mounted to the vehicle in a labor intensive, time consuming and expensive manner. To acoustically decouple the fuel tank from the body, a simple foam or rubber layer is disposed between the bands and the tank or a rubber grommet is disposed between the brackets and the vehicle body.

After being in service, these band and bracket arrangements are usually difficult and time consuming to disconnect for service and/or replacement of the fuel tank and then to reassemble and reinstall after the service is completed or the fuel tank replaced.

SUMMARY OF THE INVENTION

In accordance with this invention, a plastic fuel tank is mounted on an automotive vehicle body or frame by couplings fixed to the fuel tank and releasably received on an elongate carrier underlying the fuel tank and attached adjacent its ends to the vehicle body. Preferably, the couplings are formed of a plastic material welded to the plastic tank and releasably attached to the carrier by fingers or nipples projecting and snap-fitting into holes or pockets in the carrier. Preferably, at least two longitudinally spaced-apart couplings are disposed to lie in substantially the same plane when coupled to the carrier and are welded in spaced-apart relation on an adjacent portion of the fuel tank.

Preferably, the carrier generally conforms to and extends longitudinally across the bottom of the tank and in cross-section is channel shaped to enhance its torsional resistance and strength and to receive portions of the coupling therein to enhance the stability of the attachment of the coupling to the carrier.

Objects, features and advantages of this invention are to provide a pre-assembled fuel tank, carrier and releasable couplings to rationalize and simplify attachment of the fuel tank to an automotive vehicle, in service to provide easy removal and reassembly of the carrier components and removal, service and/or replacement of the fuel tank and/or components therein, of relatively simple design, economical manufacture and assembly and in service has a long useful life.

BRIEF DESCRIPTION OF THE DRAWINGS

These and other objects, features and advantages of this invention will be apparent from the following detailed description of the preferred embodiment, appended claims and accompanying drawings in which:

FIG. 2 is an enlarged view of a portion of the carrier and fuel tank of FIG. 1 in the region of a coupling.

DETAILED DESCRIPTION

Figure 1:
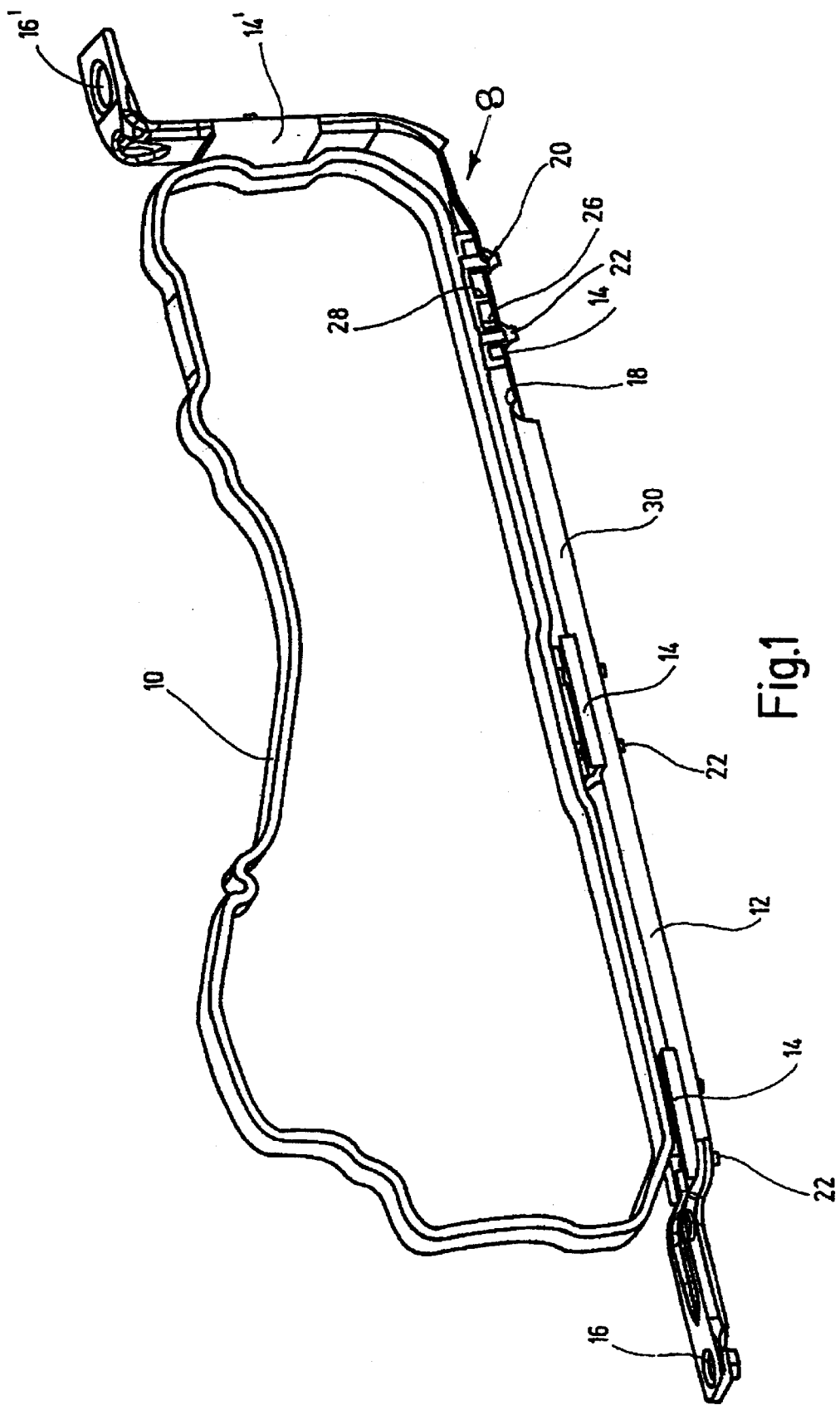
FIG. 1 is a perspective view of a carrier with couplings fixed to the exterior of a bottom wall of a plastic fuel tank shown in a fragmentary slab-like cross-section.

Referring in more detail to the drawings, FIG. 1 illustrates a mounting device 8 embodying this invention attached to a blow molded plastic fuel tank 10 with a carrier 12 on which a plurality of couplings 14 are releasably connected and attached to the exterior of a wall of an automotive fuel tank. Typically, at least two laterally spaced-apart carriers 12 and associated couplings 14 are utilized to attach a fuel tank to a vehicle body. The carrier 12 has mounting flanges adjacent its ends with holes or openings 16, 16' through which mounting bolts or other fasteners are received when the mounting device with the fuel tank is secured to the body of an automotive vehicle. Preferably, at least a portion of the carrier 12 underlying the fuel tank is rectilinear or longitudinally aligned and in cross-section has a channel shape forming a recess 18 in which each coupling member 14 is disposed preferably in a form fitting manner.

Preferably, the carrier 12 at least partially conforms to the outer contour of the tank. The carrier may be formed of metal such as a sheet metal stamping and preferably is made of a suitable plastic material by injection molding processes. The channel-shape portion of the carrier 12 increases its torsional rigidity and strength.

As shown in FIG. 2, each coupling 14 is releasably connected to its associated carrier 12 preferably by at least two fingers or nipples 22 which snap fit into openings 20 through the base of the channel 18 of their associate carrier. Preferably, each finger 22 is integral with its coupling 14 and has at its distal end a head with an enlarged flared or frusto-conical portion which may be yieldably forced through the opening 20 and snaps into engagement with an underlying portion of the carrier. Preferably, depending on the size of the coupling 14, it has two or three fingers or nipples 22. Preferably, each coupling 14, including its fingers or nipples 22, is made of a thermoplastic material and is permanently attached or fixed to the tank by a plastic welding process.

Preferably, further couplings 14', which are not welded to the fuel tank, are located along and upright or generally vertical portion of the carrier and received in complementary recesses or pockets 23 molded in the tank to further facilitate mounting and retention of the tank on the vehicle. The couplings 14' are not welded or otherwise permanently fixed to the tank because it would make connection of the couplings 14 to the carrier 12 difficult if couplings were fixed to the tank in different planes. Thus, all of the couplings 14 fixed to the tank which are associated with a given carrier are located so that corresponding portions of their fingers and other portions bearing on the carrier lie in substantially the same plane.

Preferably, the couplings 14 are made of an elastic thermoplastic material which is compatible with and welded to the plastic material of at least the exterior layer of the wall of the fuel tank which is typically an elastic thermoplastic material such as HDPE. Desirably, when formed of a suitable thermoplastic material, the couplings 14 and 14' acoustically decouple the fuel tank from the vehicle body. The coupling 14 may be made of HDPE by a plastic injection molding process. To improve the disconnecting properties of the couplings and to reduce the amount of material needed to make the couplings, preferably, they are not formed as solid bodies but have a number of open depressions or pockets 26 and ribs 28 facing or opening onto the carrier 12.

Preferably, the body of each coupling 14 is complementary to and form fitting with the channel 18 of the carrier 12 to enhance and insure sufficient resistance against lateral forces which impart a shearing force to the couplings 14. This resistance may be further enhanced by the longitudinal edges of each coupling 14 at least partially overlapping and bearing on the outer edge portions 30 of the carrier 12.

Preferably, to facilitate welding, the thermoplastic coupling to the plastic fuel tank wall or shell, each coupling 14 has at least one and preferably two or three integral rib-like projections on the surface of a body facing the tank wall which surface may otherwise be essentially planar. These ribs or projections are heated and melt more quickly than a plane surface during the heat welding and therefore make the welding easier. The plastic material from which the coupling is made in addition to being compatible with the HDPE or other plastic material of the fuel tank, should have a low flow behavior in order to have long term form stability in service and should retain a high degree of elasticity after welding and not harden or become unelastic under the influence of heat or in service.

In use, after the couplings 14 have been located and fixed by welding to the plastic fuel tank 10, the coupling 14' is positioned and snapped onto the carrier 12 and then the carrier is positioned over the fingers of the couplings 14 and urged into snap-fitting engagement therewith. Subsequently, the entire assembly of the fuel tank, couplings 14, 14' and associated carriers 12 is attached by an original equipment manufacturer to a body of an automotive vehicle by inserting bolts or other suitable fasteners through the holes 16 adjacent the ends of each carrier 12 and securing the fasteners to the vehicle body. In service of the vehicle, if it is necessary to remove the fuel tank or to replace a coupling and/or carrier, this may be readily and easily accomplished by detaching the mounting fasteners, releasing the snap fingers of the couplings, and disconnecting them and the fuel tank from their associated carrier 12.

We claim:

1. A fuel tank assembly for a motor vehicle, the assembly comprising: a motor vehicle fuel tank with an exterior wall of a plastic material, the exterior wall having a bottom portion, a carrier for the fuel tank which conforms to at least part of the outer contour of the bottom portion of the tank, extends across the bottom portion of the tank, has an opening for receiving a finger of a coupling and is configured to be attached to an overlying body of the motor vehicle, and a coupling at least in part made of a thermoplastic material heat welded to the bottom portion of the tank and having at least one finger with an enlarged head with the finger releasably received in the opening of and snap-fitted into the carrier and releasably connected to the carrier at a location generally opposite the portion of the coupling welded to the tank.

2. The assembly of claim 1 wherein the coupling comprises at least one rib-like projection on a surface thereof oriented toward the tank.

3. The assembly of claim 1 wherein the coupling comprises a plurality of depressions at a side thereof oriented toward the carrier.

4. The assembly of claim 1 wherein at least part of the carrier which underlies the tank has a channel shape with spaced-apart edges and the coupling has a generally rectangular shape and overlaps at least partially and bears on the edges of the carrier.

5. The assembly of claim 1 wherein the carrier comprises a longitudinally aligned channel in which at least one coupling member is disposed in a form-fitting manner.

6. The assembly of claim 1 wherein the finger has an undercut head configured to snap-fit into the opening of the carrier.

7. The assembly of claim 1 wherein the coupling is injection-molded of an elastic thermoplastic material weldable to a high density polyethylene (HDPE) material.

8. The assembly of claim 1 wherein the finger with the enlarged head is snap fit into the opening of the carrier.

9. The assembly of claim 8 wherein the connector has at least two of the fingers which are spaced apart and extend substantially parallel to each other.

10. The assembly of claim 1 wherein the at least one finger extends through the opening of the carrier and its head bears on the carrier.

11. The assembly of claim 1 wherein the exterior of at least the bottom portion of the tank comprises a high density polyethylene material and the coupling including the at least one finger is molded in one homogeneous piece of a thermoplastic material which is heat welded to the high density polyethylene material of the bottom portion of the tank.

12. The assembly of claim 1 wherein at least a portion of the carrier has in cross-section a channel shape and the coupling is received in this portion with the channel shape with a form fit.

13. A device for mounting a plastic fuel tank on an overlying body of a motor vehicle, the device comprising: a carrier for the plastic fuel tank which is shaped to conform to at least part of the outer contour of a bottom of the tank, extends across the bottom of the tank and is configured to be attached to the overlying body of the motor vehicle, at least one coupling disposed in assembly between the carrier and the tank and having at least one finger with an enlarged head, the carrier having at least one opening to receive the at least one finger, the at least one coupling being made at least in part of a thermoplastic material to be welded to the plastic fuel tank, the at least one finger with the enlarged head releasably connected to the carrier at a position generally opposite to a portion of the at least one coupling which in assembly is adjacent the tank, and the enlarged head of the at least one finger is snap-fitted into the at least one opening of the carrier.

14. The device of claim 13 wherein the coupling is injection-molded of an elastic thermoplastic material adapted to be welded to high density polyethylene (HDPE) material.

* * * * *